(12) United States Patent
Hayakawa (10) Patent No.: US 10,008,197 B2
(45) Date of Patent: Jun. 26, 2018

(54) KEYWORD DETECTOR AND KEYWORD DETECTION METHOD

(71) Applicant: FUJITSU LIMITED, Kawasaki-shi, Kanagawa (JP)

(72) Inventor: Shoji Hayakawa, Akashi (JP)

(73) Assignee: FUJITSU LIMITED, Kawasaki (JP)

( * ) Notice: Subject to any disclaimer, the term of this patent is extended or adjusted under 35 U.S.C. 154(b) by 31 days.

(21) Appl. No.: 15/332,000

(22) Filed: Oct. 24, 2016

(65) Prior Publication Data
US 2017/0148429 A1 May 25, 2017

(30) Foreign Application Priority Data
Nov. 24, 2015 (JP) .................................. 2015-228889

(51) Int. Cl.
| | |
|---|---|
| G10L 15/16 | (2006.01) |
| G10L 15/14 | (2006.01) |
| G10L 15/187 | (2013.01) |
| G10L 15/02 | (2006.01) |
| G10L 15/08 | (2006.01) |

(52) U.S. Cl.
CPC ............ G10L 15/02 (2013.01); G10L 15/142 (2013.01); G10L 15/16 (2013.01); G10L 15/187 (2013.01); G10L 2015/022 (2013.01); G10L 2015/025 (2013.01); G10L 2015/088 (2013.01)

(58) Field of Classification Search
CPC ...... G10L 15/16; G10L 15/142; G10L 15/187
See application file for complete search history.

(56) References Cited

U.S. PATENT DOCUMENTS

| | | | | |
|---|---|---|---|---|
| 9,466,292 | B1 * | 10/2016 | Lei | .......................... G10L 15/16 |
| 2012/0065976 | A1 * | 3/2012 | Deng | ....................... G10L 15/14 |
| | | | | 704/256.1 |
| 2014/0257805 | A1 * | 9/2014 | Huang | ................... G10L 15/063 |
| | | | | 704/232 |

(Continued)

FOREIGN PATENT DOCUMENTS

| | | |
|---|---|---|
| JP | 2012-032538 | 2/2012 |
| JP | 2015-102806 | 6/2015 |

OTHER PUBLICATIONS

A.J. Kishan Thambiratnam, "Acoustic Keyword Spotting in Speech With Applications to Data Mining", Ph.D. Thesis, Queensland University of Technology, Mar. 9, 2005 (248 pages).

*Primary Examiner* — Paras D Shah
*Assistant Examiner* — Bryan S Blankenagel
(74) *Attorney, Agent, or Firm* — Fujitsu Patent Center (57) ABSTRACT

A keyword detector includes a processor configured to calculate a feature vector for each frame from a speech signal, input the feature vector for each frame to a DNN to calculate a first output probability for each triphone according to a sequence of phonemes contained in a predetermined keyword and a second output probability for each monophone, for each of at least one state of an HMM, calculate a first likelihood representing the probability that the predetermined keyword is uttered in the speech signal by applying the first output probability to the HMM, calculate a second likelihood for the most probable phoneme string in the speech signal by applying the second output probability to the HMM, and determine whether the keyword is to be detected on the basis of the first likelihood and the second likelihood.

3 Claims, 9 Drawing Sheets

(56) References Cited

U.S. PATENT DOCUMENTS

| | | | |
|---|---|---|---|
| 2014/0372112 A1* | 12/2014 | Xue | G10L 15/16 |
| | | | 704/232 |
| 2016/0078339 A1* | 3/2016 | Li | G06N 3/084 |
| | | | 706/20 |
| 2016/0260428 A1 | 9/2016 | Matsuda et al. | |
| 2017/0148444 A1* | 5/2017 | Bocklet | G10L 17/22 |

\* cited by examiner

| NUMBER OF OUTPUT NEURON | STATE LABEL OF HMM | EXPLANATION |
|---|---|---|
| 1 | $C_5$ | FIRST STATE S1 OF "k-i+t" |
| 2 | $C_{12}$ | SECOND STATE S2 OF "t-a+n" |
| ... | ... | ... |
| 2044 | $C_{2011}$ | FIRST STATE S1 OF "a" |
| 2045 | $C_{2053}$ | THIRD STATE S3 OF "n" |
| ... | ... | ... |

KEYWORD DETECTOR AND KEYWORD DETECTION METHOD

CROSS-REFERENCE TO RELATED APPLICATION

This application is based upon and claims the benefit of priority of the prior Japanese Patent Application No. 2015-228889, filed on Nov. 24, 2015, and the entire contents of which are incorporated herein by reference.

FIELD

The embodiments discussed herein are related to a keyword detector and a keyword detection method for detecting a predetermined keyword from a speech signal.

BACKGROUND

Speech recognition techniques for detecting specific keywords from speech signals recording, e.g., conversations or speeches have been conventionally employed. Such speech recognition techniques use, e.g., HMMs (Hidden Markov Models) as acoustic models. In particular, a GMM-HMM has been proposed in which the output probability of each phoneme for features of input speech in each state of the HMM is calculated on the basis of a mixture of normal distributions (GMM: Gaussian Mixture Model) (see, e.g., A. J. Kishan, "ACOUSTIC KEYWORD SPOTTING IN SPEECH WITH APPLICATIONS TO DATA MINING," Ph.D. Thesis, Queensland University of Technology, 2005 (to be referred to as non-patent literature 1 hereinafter)).

The technique disclosed in non-patent literature 1 is referred to as word spotting, which postulates that a speech signal contains words that are not to be detected. Therefore, in this technique, for keywords to be detected, a triphone GMM-HMM obtained by learning a GMM-HMM for each combination of the phoneme of interest and the preceding and succeeding phonemes is used for likelihood calculation of a maximum-likelihood phoneme string. For other spoken words, a monophone GMM-HMM obtained by learning a GMM-HMM for each phoneme of interest independently of the preceding and succeeding phonemes is used for likelihood calculation of a maximum-likelihood phoneme string.

Techniques which use neural networks have been proposed to improve the recognition accuracy in speech recognition techniques which use HMMs as acoustic models (see, e.g., U.S. Patent Application Publication No. 2012/0065976).

In the technique disclosed in U.S. Patent Application Publication No. 2012/0065976, a DBN (Deep Belief Network) (also referred to as a DNN (Deep Neural Network; to be referred to as a DNN hereinafter)) is used instead of a GMM, to calculate the output probability of each phoneme in each state of the HMM. In other words, a feature vector including a plurality of features calculated from a speech signal is input to the DNN to calculate the output probability of each phoneme in each state of the HMM. This technique then obtains the product of the calculated output probability and the state transition probability for each phoneme in accordance with the HMM to calculate a likelihood for a maximum-likelihood phoneme string.

SUMMARY

In the technique disclosed in U.S. Patent Application Publication No. 2012/0065976, a feature vector is input to the DNN to calculate the output probability of each phoneme for each state of the triphone HMM on the basis of the value of an output neuron corresponding to the state of the triphone HMM in the output layer of the DNN. In the DNN, a "raw" distribution of feature vectors itself is represented by the DNN, instead of using a specific distribution including a normal distribution for representing the distribution of feature vectors for each phoneme, such as a normal distribution in GMM. Therefore, the recognition accuracy is expected to improve. On the other hand, when the DNN is used to calculate an output probability, a "raw" distribution representing feature vectors in a complicated shape may not be decomposed into individual simple normal distributions. In the technique disclosed in U.S. Patent Application Publication No. 2012/0065976, since distribution probabilities may not be shared between triphones and monophones even for the same phonemes, output neurons of the DNN and the states of the HMM for each phoneme may be preferably associated with each other in a one-to-one correspondence. When the technique disclosed in U.S. Patent Application Publication No. 2012/0065976 is applied to the word spotting technique as described in non-patent literature 1, DNNs may be preferably learned individually for triphones and monophones. Further, during execution of keyword detection process, the DNN for triphones and the DNN for monophones may be preferably used to calculate the output probability of each phoneme in each state of the HMM, independently of each other. This may involve a huge amount of calculation during learning process and during execution of keyword detection process.

According to an embodiment, a keyword detector is provided. The keyword detector includes a processor configured to: divide a speech signal into frames each with a predetermined time length; calculate a feature vector including a plurality of features representing characteristics of a human voice, for each frame; input the feature vector for each of the frames to a deep neural network to calculate a first output probability for each of a plurality of triphones according to a sequence of phonemes contained in a predetermined keyword, for each of at least one state of a Hidden Markov Model and to calculate a second output probability for each of a plurality of monophones, for each of at least one state of the Hidden Markov Model; calculate a first likelihood representing a probability that the predetermined keyword is uttered in the speech signal by applying the first output probability to the Hidden Markov Model; calculate a second likelihood for a most probable phoneme string in the speech signal by applying the second output probability to the Hidden Markov Model; and determine whether the keyword is to be detected on the basis of the first likelihood and the second likelihood.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A keyword detector will be described below with reference to the accompanying drawings. The keyword detector calculates an output probability for each state of a phoneme HMM, using a DNN. To reduce the amount of calculation in learning a DNN and output probability calculation, the inventor of the present invention focused attention on the point that it is expected that the parameters of triphone DNNs and the parameters of monophone DNNs have a certain correlation, so as to identify the same phonemes.

Figure 1A:
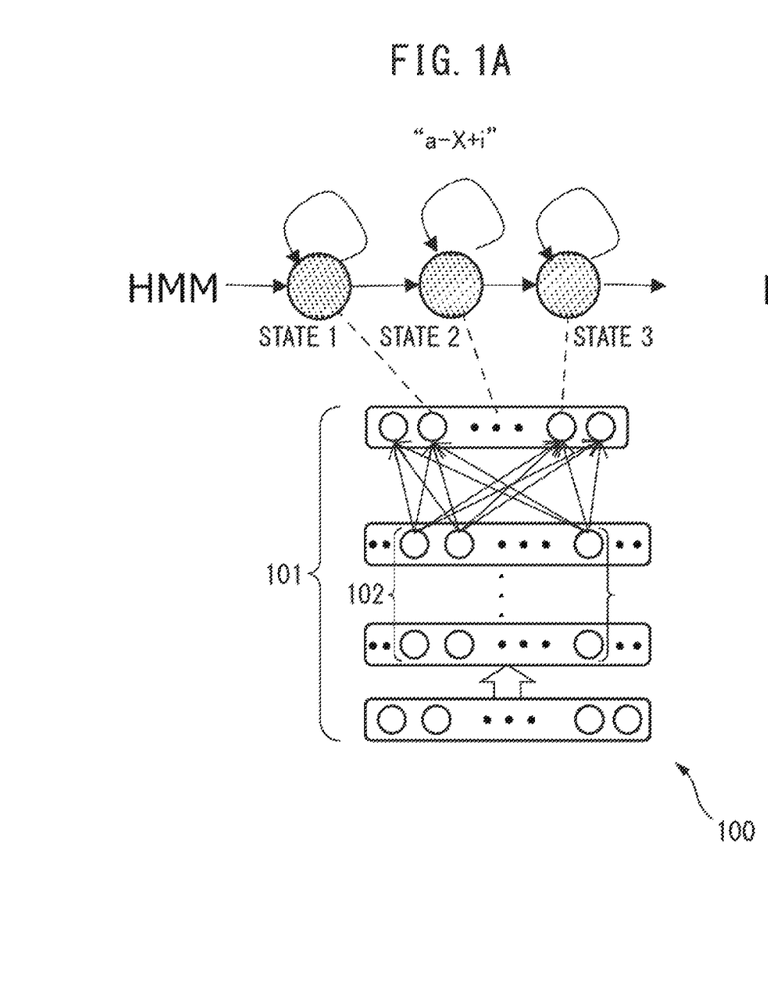
FIG. 1A is a diagram illustrating an exemplary DNN-HMM dedicated to triphones.
Figure 1B:
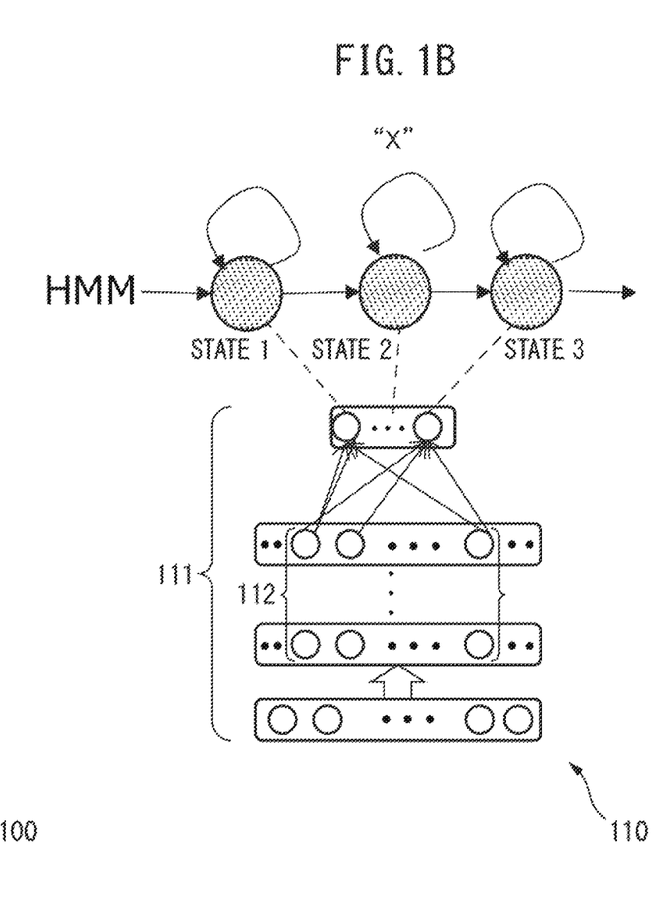
FIG. 1B is a diagram illustrating an exemplary DNN-HMM dedicated to monophones.

FIG. 1A is a diagram illustrating an exemplary DNN-HMM dedicated to triphones and FIG. 1B is a diagram illustrating an exemplary DNN-HMM dedicated to monophones. It is assumed that a DNN 101 included in a DNN-HMM 100 for triphones has been learned to identify the triphone "a−X+i." The symbol denoting the triphone "α−β+γ" represents that the phoneme "α" immediately precedes the phoneme "β" and the phoneme "γ" immediately succeeds the phoneme "β". It is assumed that a DNN 111 included in a DNN-HMM 110 for monophones has been learned to identify the phoneme "X". In this case, networks 102 and 112 used to identify the phoneme "X" are formed in the input and hidden layers of the DNNs 101 and 111, respectively.

In this manner, when the central phoneme of the triphone is identical to the phoneme of the monophone, networks for identifying the same kinds of phoneme are formed in both triphone DNNs and monophone DNNs. Therefore, it is expected that the learning results of these DNNs have a certain correlation. In view of this, in this embodiment, the keyword detector uses one DNN for triphones and monophones. In the DNN, the input and hidden layers are shared between triphones and monophones. On the other hand, the output layer separately includes output neurons for triphones and output neurons for monophones. The keyword detector learns a DNN by simultaneously using a triphone teacher and a monophone teacher for each individual feature vector for learning. Further, during execution of keyword detection process, the keyword detector calculates the output probability of each triphone on the basis of the value of each output neuron for triphones in the DNN, for the input feature vector. On the other hand, the keyword detector calculates the output probability of each monophone on the basis of the value of each output neuron for monophones in the DNN, for the input feature vector. The keyword detector thus keeps small the amount of calculation involved in learning the DNN for output probability calculation of each phoneme and the amount of calculation involved in output probability calculation.

Figure 2:
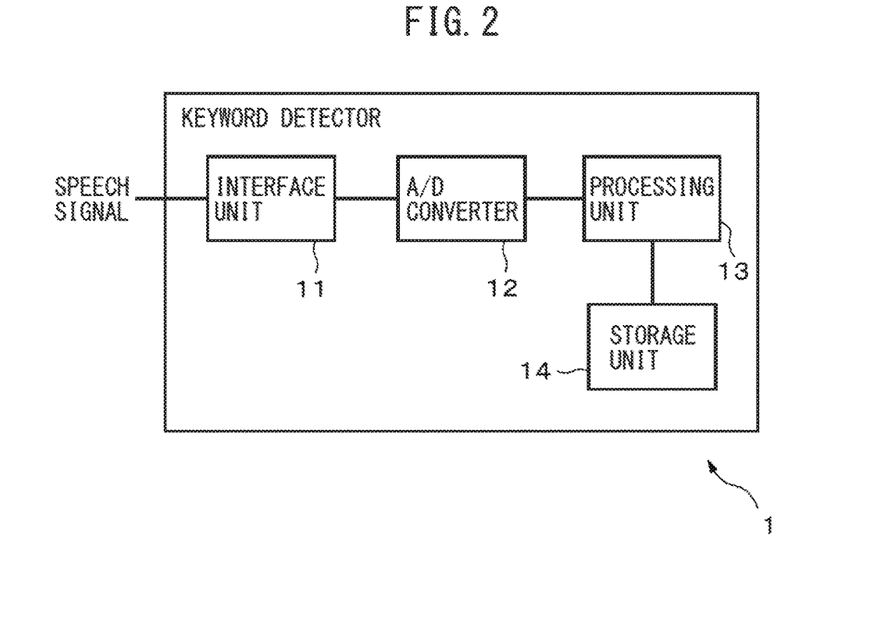
FIG. 2 is a block diagram illustrating the schematic configuration of a keyword detector according to an embodiment.

FIG. 2 is a block diagram illustrating the schematic configuration of a keyword detector according to an embodiment. A keyword detector 1 includes an interface unit 11, an analog/digital converter 12, a processing unit 13, and a storage unit 14.

The interface unit 11 exemplifies a speech input unit and includes an audio interface. The interface unit 11, for example, acquires an analog monaural speech signal containing conversational speech between the caller and receiver from a telephone recording adapter (not illustrated) connected to a telephone line. Alternatively, the interface unit 11 is connected to a microphone and acquires a monaural speech signal generated by the microphone. The interface unit 11 outputs the speech signal to the analog/digital converter (to be referred to as an A/D converter hereinafter) 12. The A/D converter 12 samples an analog speech signal at a predetermined sampling rate to digitize the speech signal. The A/D converter 12 outputs the digital speech signal to the processing unit 13.

The processing unit 13 includes, e.g., one or more processors, a memory circuit, and a peripheral circuit. The processing unit 13 executes keyword detection process to detect a predetermined keyword from the digital speech signal. The keyword detection process by the processing unit 13 will be described in detail later.

The storage unit 14 includes, e.g., a readable/writable nonvolatile semiconductor memory and a readable/writable volatile semiconductor memory. The storage unit 14 may further include a magnetic or optical recording medium and its access unit. The storage unit 14 stores various data used for keyword detection process executed on the processing unit 13 and various data generated in the course of the keyword detection process. The storage unit 14 stores, e.g., the weight factor and the bias for connection between respective neurons of the DNN, a label representing the correspondence between the number of an output neuron and the state label of an HMM, the a priori probability for each state of the HMM, and the state transition probability between states. The storage unit 14 further stores a keyword detection result obtained by executing keyword detection process by the processing unit 13. The storage unit 14 may further store a speech signal of a sample for learning used to learn a DNN-HMM.

The processing unit 13 will be described in detail below.

Figure 3:
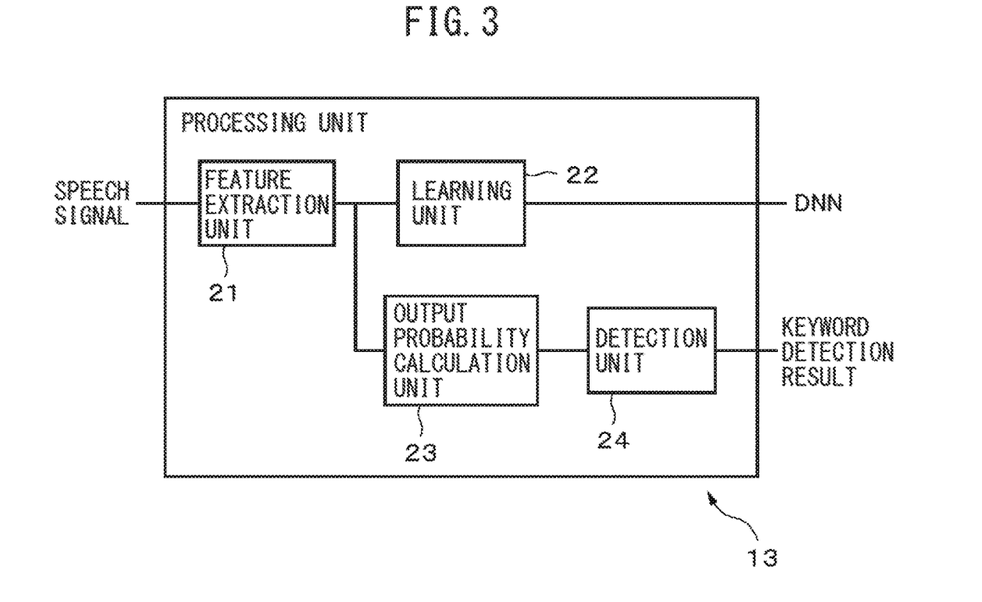
FIG. 3 is a functional block diagram illustrating a processing unit of the keyword detector.

FIG. 3 is a functional block diagram illustrating the processing unit 13. The processing unit 13 includes a feature extraction unit 21, a learning unit 22, an output probability calculation unit 23, and a detection unit 24.

Each of these units of the processing unit 13 serves as, e.g., a functional module implemented by a computer program executed on the processor/processors of the processing unit 13. Alternatively, each of these units of the processing unit 13 may form one or more integrated circuits for implementing the function of the corresponding unit.

In this embodiment, the processing unit 13 uses an HMM of three states as a phoneme HMM and calculates an output probability for each state of the phoneme HMM, using a DNN, to detect a keyword from a speech signal. The learning unit 22 is used in process for learning a DNN. On the other hand, the output probability calculation unit 23 and the detection unit 24 are used for keyword detection process which uses a DNN-HMM. The feature extraction unit 21 is used in both learning process and keyword detection process. Each unit associated with learning process will first be described below.

(Learning Process)

The feature extraction unit 21 divides a digital speech signal (to be simply referred to as a speech signal hereinafter) into frames each having a predetermined length and calculates a plurality of features representing characteristics of a human voice, for each frame. The feature extraction unit 21 generates a feature vector including each feature as an element, for each frame, and outputs the feature vector. Each phoneme contained in a speech signal used for learning process is known and the speech signal contains, e.g., a triphone contained in the keyword to be detected. In this embodiment, the frame length is set to, e.g., 32 msec. In this case, when the sampling rate of the A/D converter 12 is 8 kHz, each frame includes 256 sample points.

In this embodiment, the feature extraction unit 21 obtains as features representing characteristics of a human voice, an MFCC (Mel Frequency Cepstral Coefficient) and their delta and delta-delta cepstra.

The feature extraction unit 21 calculates a frequency coefficient by performing, e.g., fast Fourier transformation for each frame. The feature extraction unit 21 obtains as a power value, the output when a power spectrum calculated from each frequency coefficient is filtered through a filter bank having equidistant central frequencies on the Mel scale, and then calculates an MFCC by taking the frequency transform such as the DCT (Discrete Cosign Transform) of the logarithm of the obtained power value.

The feature extraction unit 21 further calculates a cepstrum for each frame and, in turn, calculates a delta cepstrum using the obtained cepstrum. The delta cepstrum is calculated as:

$$\Delta C_n(t) = \frac{\sum_{k=-K}^{K} kh_k C_n(t+k)}{\sum_{k=-K}^{K} k^2 h_k} \quad (1)$$

where $C_n(t)$ is the nth-order cepstral coefficient of the frame t and $\Delta C_n(t)$ is the nth-order delta cepstral coefficient. $h_k$ is the symmetric window function having the time width $(2K+1)$. $h_k=1$ may be set. The feature extraction unit 21 can further calculate the nth-order delta-delta cepstral coefficient by inputting $\Delta C_n(t)$ in place of $C_n(t)$ in equation (1).

The feature extraction unit 21 can set coefficients of predetermined orders (e.g., the first to 12th orders) as features, for each of the MFCC and the delta and delta-delta cepstra.

According to a modification, the feature extraction unit 21 may further calculate as features, the power sum, the pitch frequency, and the like in addition to or in place of coefficients of predetermined orders for each of the MFCC and the delta and delta-delta cepstra.

The feature extraction unit 21 stores a feature vector for each frame in the storage unit 14 as sample data for learning, together with identification information representing the state (triphone or monophone) of the phoneme HMM associated with this frame and time label information (to be referred to as "label data" hereinafter) representing the time information of the state label of the phoneme HMM.

The learning unit 22 learns a DNN for calculating an output probability for each state of the phoneme HMM, using the sample data for learning.

Figure 4:
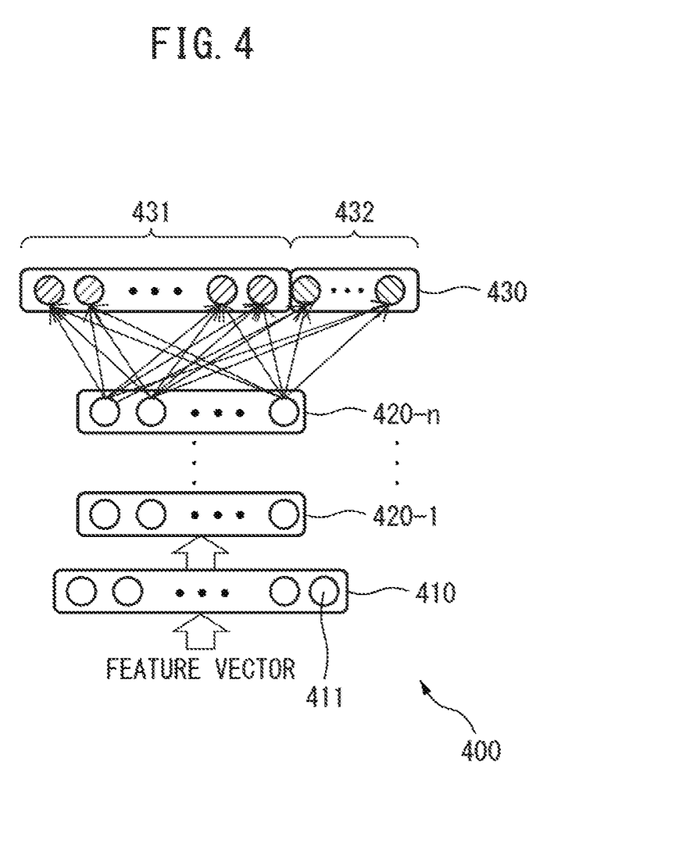
FIG. 4 illustrates a DNN used in the embodiment.

FIG. 4 is a schematic diagram illustrating a DNN used in the embodiment. A DNN 400 includes an input layer 410 to which a feature vector is inputted, a plurality of hidden layers (also referred to as middle layers) 420-1 to 420-n, and an output layer 430. Each layer includes a plurality of neurons. Neurons in adjacent layers are connected to each other by full connection (connection by all combinations of neurons) based on the weight factor and the bias determined by learning.

The input layer 410 includes neurons 411 equal in number to the product of the number of feature vectors simultaneously input to the DNN 400 and the number of dimensions of each feature vector. When, for example, the feature vector includes 12 MFCCs, 12 delta cepstral coefficients, and 12 delta-delta cepstral coefficients, this feature vector has 36 dimensions. When feature vectors corresponding to the frame of interest and five pairs of preceding and succeeding frames (a total of 11 frames) are input to the DNN 400, the input layer 410 includes 396 neurons 411. The number m of neurons of each of the hidden layers 420-1 to 420-n and the number n of hidden layers (m, n: integers of 2 or more) are preset in accordance with the number of phonemes to be identified and the number of input features. For example, m=2048 and n=5 are set.

The output layer 430 includes a plurality of output neurons 431 which output values corresponding to the output probabilities of respective triphones for each state of the phoneme HMM, and a plurality of output neurons 432 which output values corresponding to the output probabilities of respective monophones for each state of the phoneme HMM. When, for example, 40 phonemes are to be identified and an HMM of three states is used as a phoneme HMM, the output layer 430 includes 2,043 output neurons 431 for triphones and 129 output neurons 432 for monophones. Since an enormous number of combinations of triphones exist, the states of similar triphones are generally shared by the output neurons to keep the number of output neurons as small as several thousands. The output neurons 432 for monophones further include nine output neurons (3 types: silence immediately before and silence after the utterance and a short pause×3 states) which output values corresponding to output probabilities associated with the silence.

As triphones for learning a DNN, triphones according to a sequence of phonemes contained in the keyword to be detected can be used. On the other hand, monophones for learning a DNN are set independently of the keyword to be detected and can be, e.g., monophones generally used in a speech signal to undergo keyword detection process.

Figure 5:
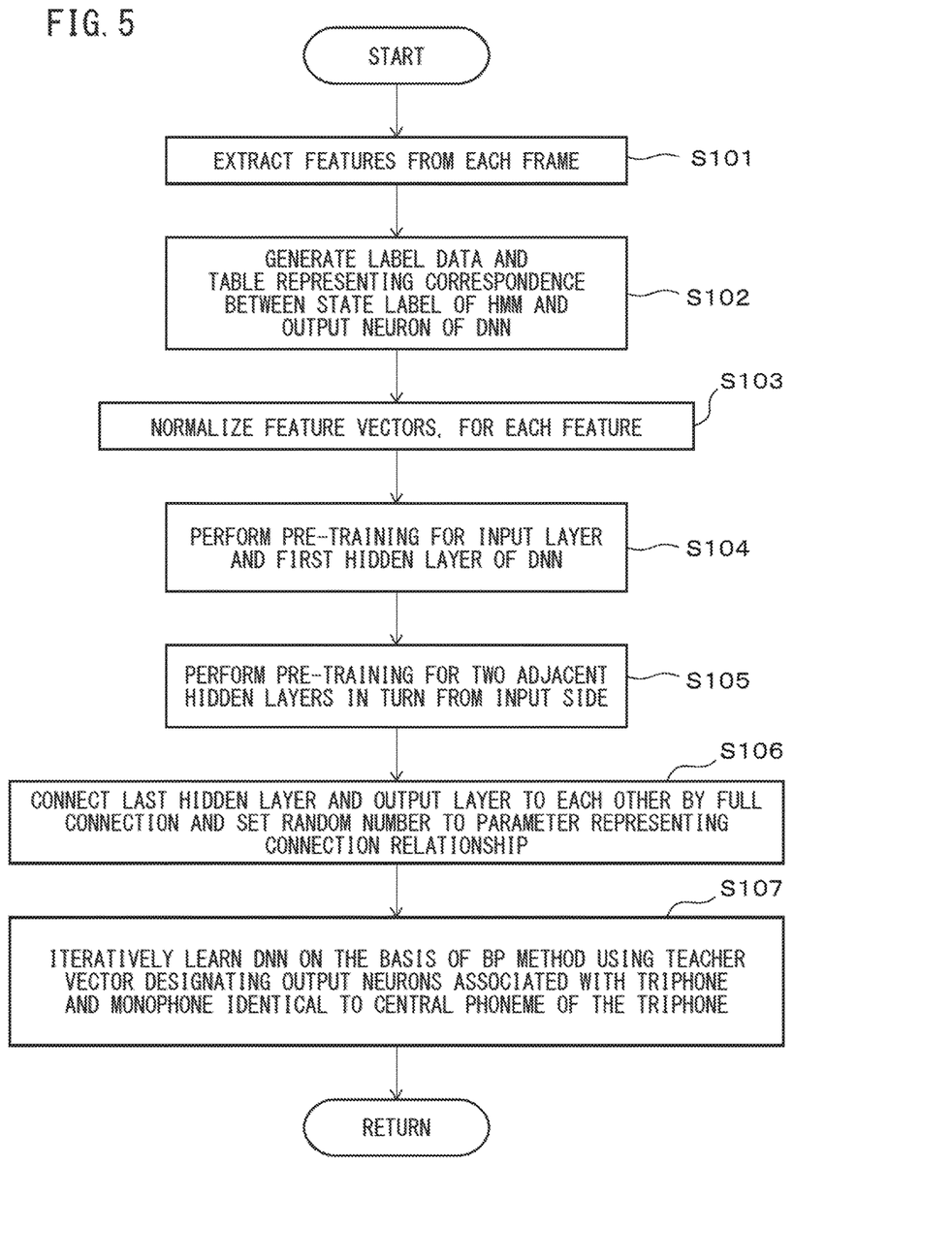
FIG. 5 is a flowchart illustrating the operation of learning process.

FIG. 5 is a flowchart illustrating the operation of learning process.

The feature extraction unit 21 calculates a feature vector for each frame from a speech signal containing known phonemes (step S101). A plurality of speech signals for learning are preferably used for each state of the phoneme HMM to generate a plurality of feature vectors.

The learning unit 22 generates label data and a table representing the correspondence between the label of each state of the phoneme HMM and the number of an output neuron in the output layer of the DNN, for each of triphones and monophones (step S102). The learning unit 22 calculates an a priori probability for each state label of the phoneme HMM on the basis of the label data of samples for learning. An a priori probability for each state label is obtained as, e.g., the ratio of the frequency of occurrence of a state corresponding to each state label to the total number of states occurring in the label data of samples used for learning, and is stored in the storage unit 14.

Figure 6:
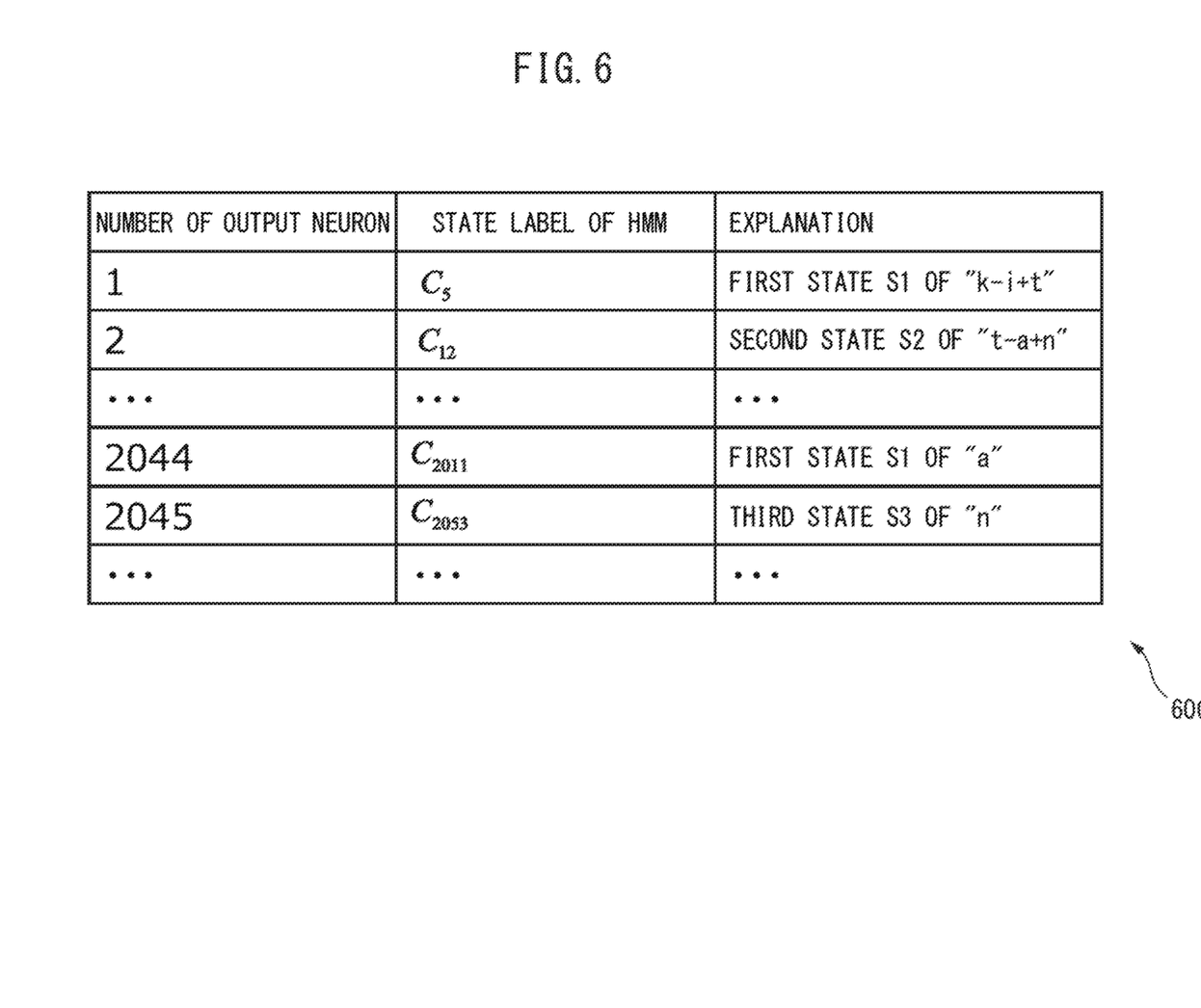
FIG. 6 illustrates an exemplary table representing the correspondence between the number of an output neuron and the state of an HMM.

FIG. 6 is a view illustrating an exemplary table representing the correspondence between the number of an output neuron and the state of a phoneme HMM. The number of an output neuron in the output layer is represented in each leftmost field of a table 600. The state label of a phoneme HMM associated with an output neuron having the number represented on the same row is represented in each central field of the table 600. A state, and a triphone or a monophone associated with an output neuron having the number represented on the same row are represented in each rightmost field of the table 600. For example, in the table 600, numbers 1 to 2043 of output neurons are associated with triphones and numbers of output neurons subsequent to 2043 are associated with monophones. For example, as represented on the top row, an output neuron having number '1' is associated with state label C5 of the phoneme HMM and first state S1 of the triphone "k−i+t."

Referring back to FIG. 5, the learning unit 22 normalizes the plurality of feature vectors used for learning, for each feature (step S103). For example, the learning unit 22 performs normalization for each feature to obtain zero average and a variance of 1.

The learning unit 22 performs pre-training using the GB-RBM (Gaussian-Bernoulli Restricted Boltzmann Machine) method for the input layer and the first hidden layer of the DNN (step S104). In this case, the learning unit 22, for example, learns connection between the input layer and the first hidden layer and the like so that, by inputting a predetermined number of feature vectors to the input layer, vectors which are identical to the input feature vectors are obtained from the first middle layer.

The learning unit 22 then performs pre-training using the BB-RBM (Bernoulli-Bernoulli Restricted Boltzmann Machine) method for two adjacent hidden layers in turn from the input side (step S105). In this case, the learning unit 22, for example, learns connection between the kth and (k+1)th hidden layers and the like so that, when output vector B from the kth (k=1, 2, . . . , (n-1)) hidden layer is input to the (k+1)th hidden layer, the output vector B is output from the (k+1)th hidden layer. After the pre-training is completed, the learning unit 22 connects the last hidden layer and the output layer to each other by full connection and sets a random number to each parameter such as a weight factor and bias representing the correction relationship (step S106).

The learning unit 22 then iteratively learns the entire DNN using the error backpropagation (BP) method by feeding to the output layer, a teacher vector designating output neurons associated with a triphone and a monophone identical to the central phoneme of the triphone (step S107).

Figure 7:
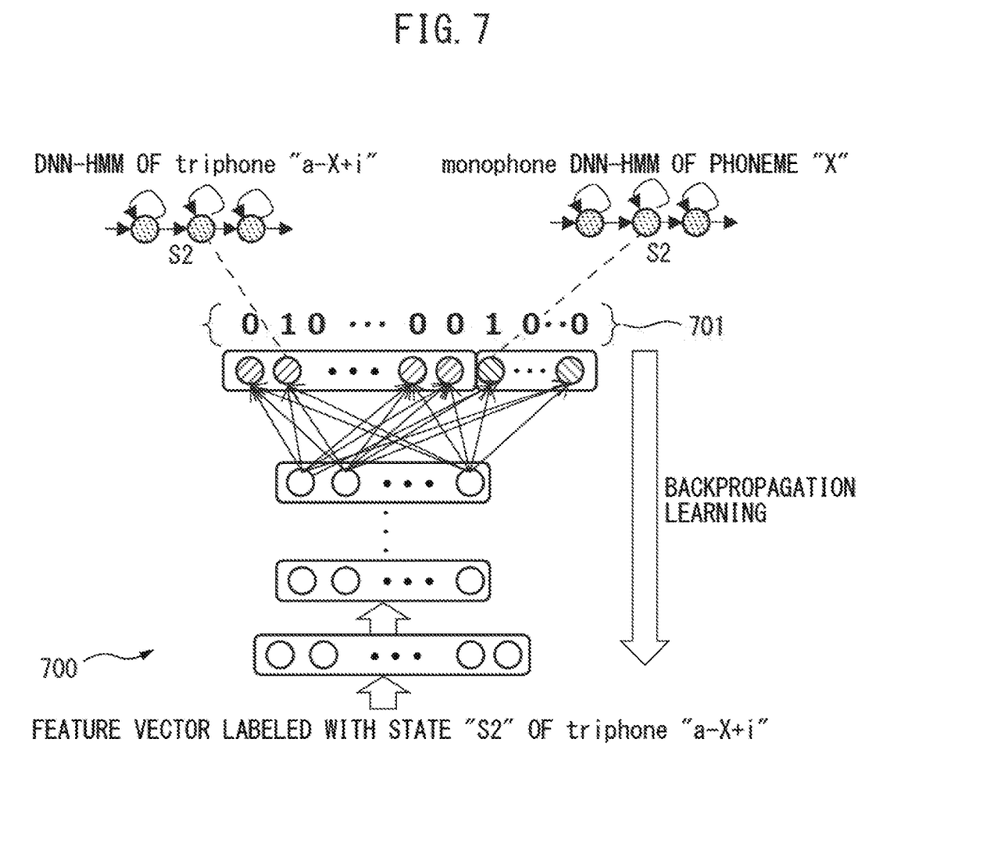
FIG. 7 illustrates a DNN when the DNN is learned using the Back Propagation (BP) method.

FIG. 7 is a schematic diagram illustrating a DNN when the DNN is learned using the BP method. In this embodiment, the learning unit 22 inputs to a DNN 700, feature vectors obtained from a frame associated with a triphone including the phoneme to be learned as its central phoneme and the preceding and succeeding frames. In doing this, the learning unit 22 uses a teacher vector designating not only an output neuron associated with the triphone but also an output neuron associated with a monophone identical to the central phoneme of the triphone. In the example illustrated as FIG. 7, when a feature vector associated with state S2 of the triphone "a−X+i" is input to the DNN 700, a teacher vector 701 is fed to the DNN 700 in the output layer. The teacher vector 701 designates '1' for an output neuron associated with state S2 of the triphone "a−X+i" and an output neuron associated with state S2 of the monophone "X," and '0' for the other output neurons. A DNN is thus learned for the input feature vector such that the values of the output neurons for which '1' is designated are larger than those of the other output neurons. The learning unit 22 learns a DNN using such a teacher vector so that a network shared between triphones and monophones can be constructed for the input and hidden layers of the DNN.

When the phoneme of interest is independent of the preceding and succeeding phonemes, the learning unit 22 learns a DNN for a monophone associated with the phoneme of interest and does not learn it for a triphone. For, e.g., a phoneme corresponding to the silence, the learning unit 22 learns a DNN only for a monophone. In this case, the learning unit 22 may preferably use a teacher vector designating '1' for an output neuron associated with this phoneme of output neurons for monophones included in the output layer, and '0' for the other output neurons (including output neurons for triphones).

The learning unit 22 learns a DNN on the basis of the BP method using associated feature vectors and teacher vector, for each combination of the phoneme to be identified and the state of an HMM. The learning unit 22 ends learning a DNN when learning based on the BP method converges or the learning count reaches a predetermined number.

After the end of DNN learning, the learning unit 22 stores in the storage unit 14, information (e.g., the weight factor and the bias for connection between neurons) for the neurons in each layer. The processing unit 13 then ends learning process.

(Keyword Detection Processing)

Keyword detection process will be described next.

The feature extraction unit 21 performs the same process as feature extraction process in learning process for a speech signal from which a keyword is to be detected, to calculate a feature vector for each frame. The feature extraction unit 21 outputs the feature vector for each frame to the output probability calculation unit 23.

The output probability calculation unit 23 inputs a feature vector for each of a predetermined number of frames including the frame of interest to the DNN learned by the learning unit 22, for each frame, to calculate an output probability for each state of the HMM associated with each phoneme for the frame of interest. The predetermined number can be set to, e.g., 11 frames (i.e., the frame of interest and five pairs of preceding and succeeding frames), as described above. The output probability calculation unit 23 performs the same normalization as that in learning process, for the feature vector calculated from each frame, before the feature vectors are input to the DNN.

In this embodiment, the output probability calculation unit 23 calculates an output probability for each state of the phoneme HMM, for each of triphones and monophones, using one DNN.

Figure 8:
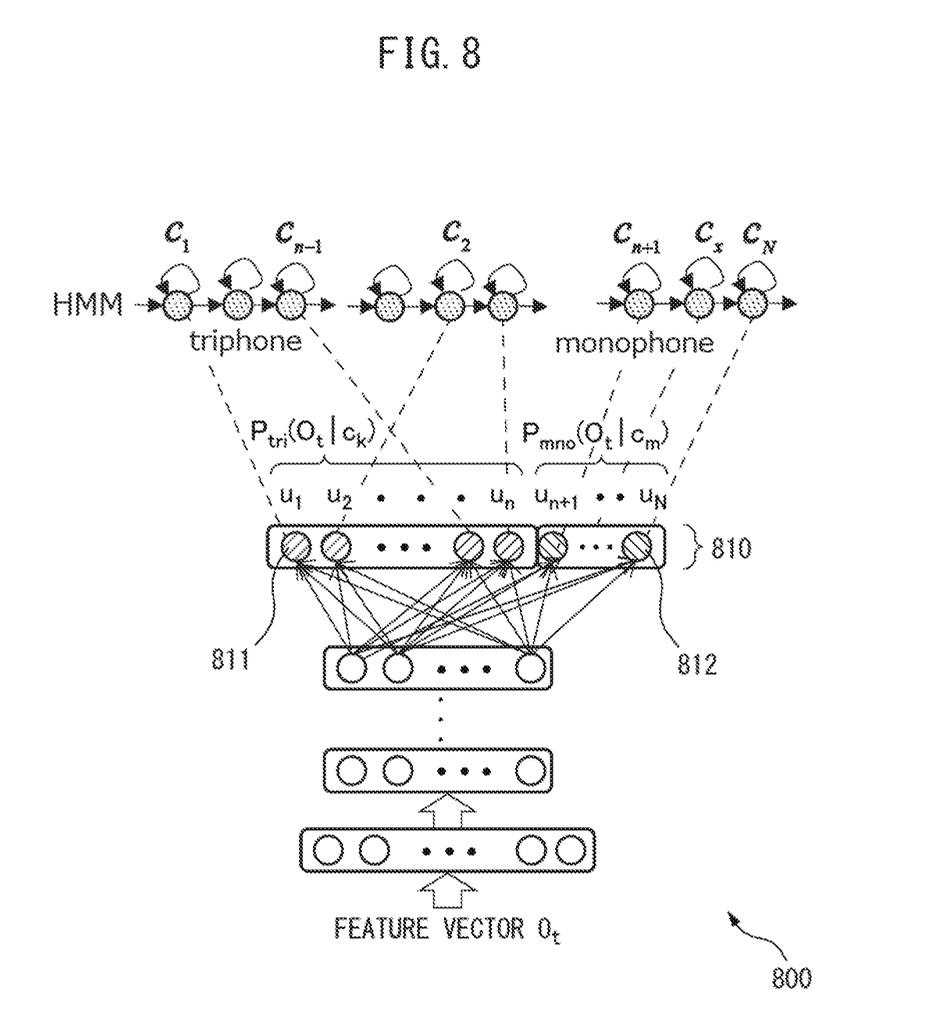
FIG. 8 is a schematic diagram illustrating output probability calculation using the DNN.

FIG. 8 is a schematic diagram illustrating output probability calculation using the DNN. When a feature vector $O_t$ is input to a DNN 800, a value according to the feature vector $O_t$ is output from each output neuron in an output layer 810 of the DNN 800. The feature vector $O_t$ includes a feature vector calculated for the frame t of interest and feature vectors calculated for a predetermined number of pairs of frames preceding and succeeding the frame of interest, as described above.

In this embodiment, the output probability calculation unit 23 calculates a probability of occurrence $P_{tri}(O_t|c_k)$ of each triphone for each state of the phoneme HMM on the basis of the value of each output neuron 811 for a triphone of output neurons present in the output layer 810. The output probability calculation unit 23 further calculates a probability of occurrence $P_{mon}(O_t|c_m)$ of each monophone for each state of the phoneme HMM on the basis of the value of each output neuron 812 for a monophone of output neurons present in the output layer 810.

In this embodiment, the output probability calculation unit 23 calculates an output probability in accordance with the softmax method. In other words, the output probability calculation unit 23 calculates an exponential value $\exp(u_i)$ of a value $u_i$ output from the output neuron, for each output neuron for a triphone. The output probability calculation unit 23 calculates a sum $\Sigma\exp(u_i)$ of exponential values $\exp(u_i)$ for each output neuron for a triphone. The output probability calculation unit 23 divides an exponential value $\exp(u_k)$ of the value output from an output neuron associated with a state $c_k$ of the triphone of interest by the sum $\Sigma\exp(u_i)$ to calculate a conditional probability $P(c_k|o_t)$ $\{=\exp(u_k)/\Sigma\exp(u_i)\}$ in which an input feature vector $o_t$ is associated with the state $c_k$. The output probability calculation unit 23 divides the conditional probability $P(c_k|o_t)$ by an a priori probability $P_{triphone}(c_k)$ for the state $c_k$ to calculate an approximate output probability $P(o_t|c_k)$ for the state $c_k$.

Similarly, the output probability calculation unit 23 calculates an exponential value $\exp(u_i)$ of a value $u_i$ output from the output neuron, for each output neuron for a monophone. The output probability calculation unit 23 calculates a sum $\Sigma\exp(u_i)$ of exponential values $\exp(u_i)$ for each output neuron for a monophone. The output probability calculation unit 23 divides an exponential value $\exp(u_m)$ of the value output from an output neuron associated with a state $c_m$ of the monophone of interest by the sum $\Sigma\exp(u_i)$ to calculate a conditional probability $P(c_m|o_t)$ $\{=\exp(u_m)/\Sigma\exp(u_i)\}$ in which an input feature vector $o_t$ is associated with the state $c_m$. The output probability calculation unit 23 divides the conditional probability $P(c_m|o_t)$ by an a priori probability $P_{monophone}(c_m)$ for the state $c_m$ to calculate an approximate output probability $P(o_t|c_m)$ for the state $c_m$. The a priori probabilities $P_{triphone}(c_k)$ and $P_{monophone}(c_m)$ are obtained as, e.g., the ratios of the occurrence of the states $c_k$ and $c_m$ to the total numbers of states occurring in the label data of a sample used for learning, as described above.

The probability of occurrence $P(o_t|c_k)$ for the state $c_k$ of the triphone and the probability of occurrence $P(o_t|c_m)$ for the state $c_m$ of the monophone when the feature vector $o_t$ is input to the DNN are given by:

$$P(o_t | c_k) \approx \frac{\exp(u_k)}{P_{triphone}(c_k) \sum_{i \in triphone} \exp(u_i)} \quad (2)$$

$$P(o_t | c_m) \approx \frac{\exp(u_m)}{P_{monophone}(c_m) \sum_{i \in monophone} \exp(u_i)}$$

The output probability calculation unit 23 may preferably calculate the output probability of each triphone and the output probability of each monophone for each state of the phoneme HMM in accordance with equations (2) for each frame. The output probability calculation unit 23 then outputs the calculated output probabilities to the detection unit 24.

The detection unit 24 detects a keyword using the output probabilities obtained by the output probability calculation unit 23 as the output probabilities of the triphone and the monophone for the state associated with the phoneme HMM, for each frame. In this embodiment, the detection unit 24 detects a keyword in accordance with the word spotting method.

For example, the detection unit 24 calculates a cumulative log-likelihood for a sequence of triphones associated with the keyword to be detected for the speech period of interest by applying the output probability of the triphone in each state of the phoneme HMM to the phoneme HMM, for each frame within the speech period. In doing this, the detection unit 24 calculates a logarithmic value of the probability (state transition probability) of a transition from the state of the preceding frame serving as the transition source to that of the current frame serving as the transition destination, and a logarithmic value of the output probability in the state of the current frame. The detection unit 24 adds the logarithmic values to the cumulative log-likelihood obtained from the previous frames. The detection unit 24 repeats this arithmetic operation until the last frame of the speech period of interest is processed. The detection unit 24 can thus calculate a cumulative log-likelihood for the keyword.

The detection unit 24 obtains a sequence of monophones which maximizes the cumulative log-likelihood, i.e., a maximum likelihood phoneme string by referring to the output probability of each monophone in each state of the phoneme HMM, for each frame included in the speech period of interest.

At this time, the detection unit 24 advances Viterbi computation in which a predetermined number of state transitions are selected in descending order of the sum of the logarithmic value of the state transition probability, the logarithmic value of the output probability in the state of the current frame, and the cumulative log-likelihood in the state of the transition source, until the last frame of the speech period is processed. The detection unit 24 may select a state transition which makes the above-mentioned sum equal to or larger than a predetermined value. The detection unit 24 then selects a state maximizing the cumulative log-likelihood in the last frame, obtains a history (Viterbi path) of state transitions by back tracking until the selected state is reached, and, in turn, obtains a maximum likelihood phoneme string in the speech period on the basis of the Viterbi path.

The detection unit 24 calculates the difference (P1−P2) between a cumulative log-likelihood P1 of the keyword to be detected in the speech period of interest calculated for a triphone and a cumulative log-likelihood P2 of a maximum likelihood phoneme string in this speech period calculated for a monophone. When the difference (P1−P2) is equal to or larger than a predetermined threshold (e.g., a logarithmic value of 1.5 to 3), the detection unit 24 determines that the keyword has been uttered in the speech period. The detection unit 24 then detects the keyword.

The detection unit 24 may calculate cumulative likelihoods P1' and P2' by multiplying the cumulative likelihood in the state of the transition source by the product of the state transition probability and the output probability associated with the state of the current frame, instead of calculating cumulative log-likelihoods P1 and P2. The detection unit 24 may detect a keyword when the ratio P1'/P2' is equal to or larger than a predetermined threshold (e.g., 1.5 to 3).

When a plurality of keywords are to be detected, the detection unit 24 may preferably perform the above-mentioned process for each keyword. In doing this, the detection unit 24 may change the length of the speech period to be set, in accordance with the length of the keyword. The detection unit 24 can detect keywords from various periods in the speech signal to be detected, by shifting the speech period of interest.

Figure 9:
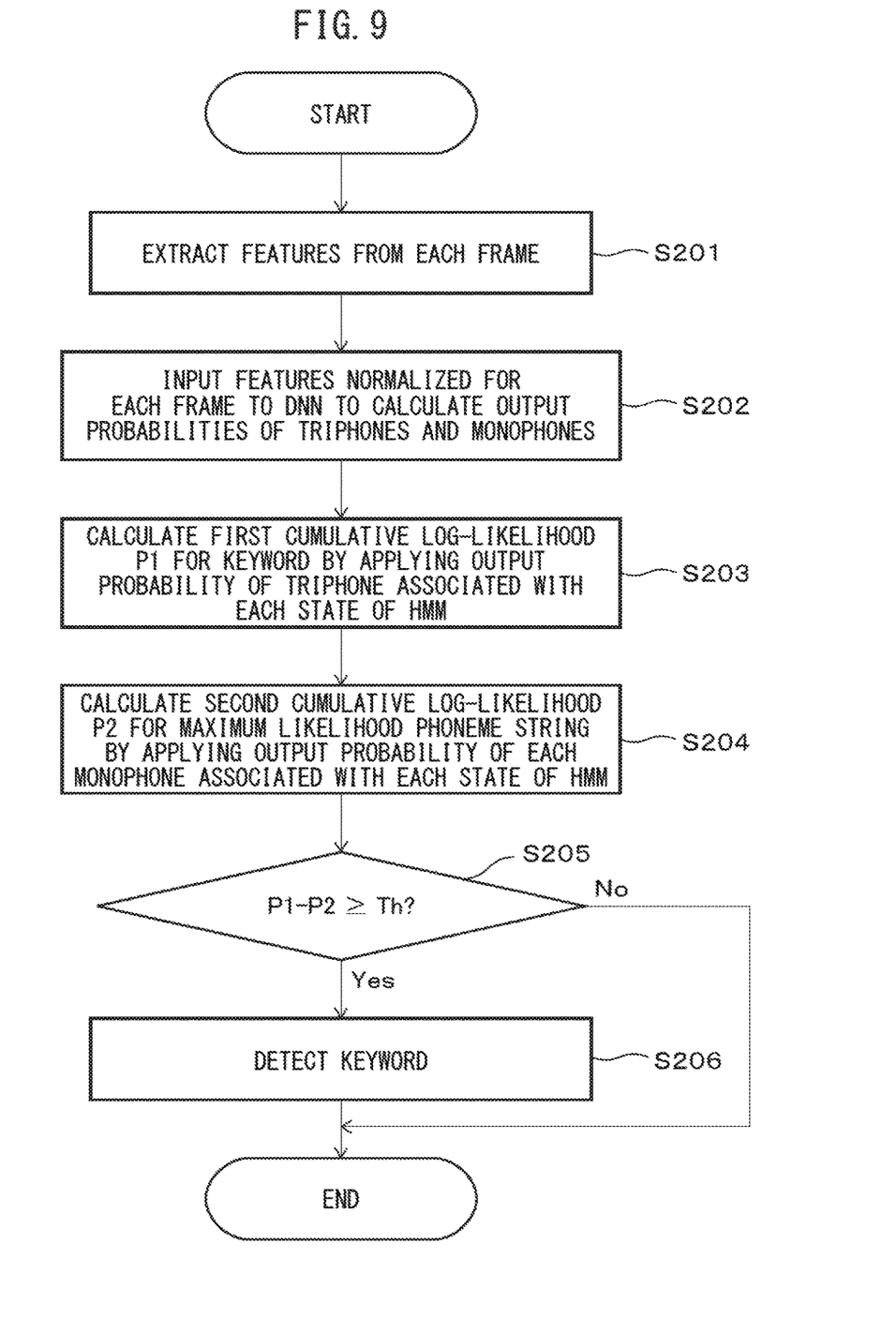
FIG. 9 is a flowchart illustrating the operation of keyword detection process.

FIG. 9 is a flowchart illustrating the operation of keyword detection process according to this embodiment. The processing unit 13 executes keyword detection process in accordance with the following operation flowchart for each keyword to be detected, for the speech period of interest.

The feature extraction unit 21 divides a speech signal into frames and calculates a feature vector including a plurality of features representing characteristics of a speaker voice, for each frame (step S201).

The output probability calculation unit 23 normalizes the feature vector of each frame and inputs the normalized feature vector to the DNN to calculate the output probability of a triphone contained in the keyword and the output probability of each monophone, for each state of the phoneme HMM for each frame (step S202).

The detection unit 24 calculates a cumulative log-likelihood P1 for the keyword to be detected for the speech period of interest by applying the output probability of a triphone in each frame within the speech period of interest to each state of the phoneme HMM (step S203).

The detection unit 24 further calculates a cumulative log-likelihood P2 of a maximum likelihood phoneme string for the speech period by applying the output probability of each monophone in each frame within the speech period to each state of the phoneme HMM (step S204). The detection unit 24 determines whether the difference (P1−P2) between the cumulative log-likelihood P1 for the keyword to be detected and the cumulative log-likelihood P2 of the maximum likelihood phoneme string is equal to or larger than a predetermined threshold Th (step S205). When the difference (P1−P2) is equal to or larger than the predetermined threshold Th (Yes in step S205), the detection unit 24 detects the keyword (step S206).

On the other hand, when the difference (P1−P2) is smaller than the predetermined threshold (No in step S205), or after step S206, the processing unit 13 ends keyword detection process.

As described above, the keyword detector uses a DNN to calculate an output probability for each state of the phoneme HMM. The keyword detector can thus improve the keyword detection accuracy by omitting approximation based on a mixture of normal distributions for the distribution of feature vectors associated with each phoneme. The keyword detector uses a DNN including an output layer separately including output neurons for triphones and output neurons for monophones, and input and hidden layers shared between the triphones and the monophones. In learning a DNN using the BP method, the keyword detector uses a teacher vector to designate an output neuron for a triphone associated with the input feature vector, and an output neuron for a monophone identical to the central phoneme of the triphone. The keyword detector can thus learn a DNN simultaneously for a triphone and a monophone. The keyword detector further calculates the output probability of each triphone by referring to the value of each output neuron for a triphone and the output probability of each monophone by referring to the value of each output neuron for a monophone. The keyword detector can thus keep small the amounts of calculation at the time of learning a DNN and at the time of output probability calculation by allowing triphones and monophones to share one DNN for the input and hidden layers. Further, since the keyword detector may preferably learn only one DNN, the time taken to learn a DNN can be shortened.

A DNN may be learned by another device. Information representing the DNN learned by the other device may be stored in the storage unit 14 in advance. In this case, since the processing unit 13 does not execute learning process, the learning unit 22 may be omitted.

The keyword detector according to any of the above-described embodiments or its modification may be mounted in a server-client system.

Figure 10:
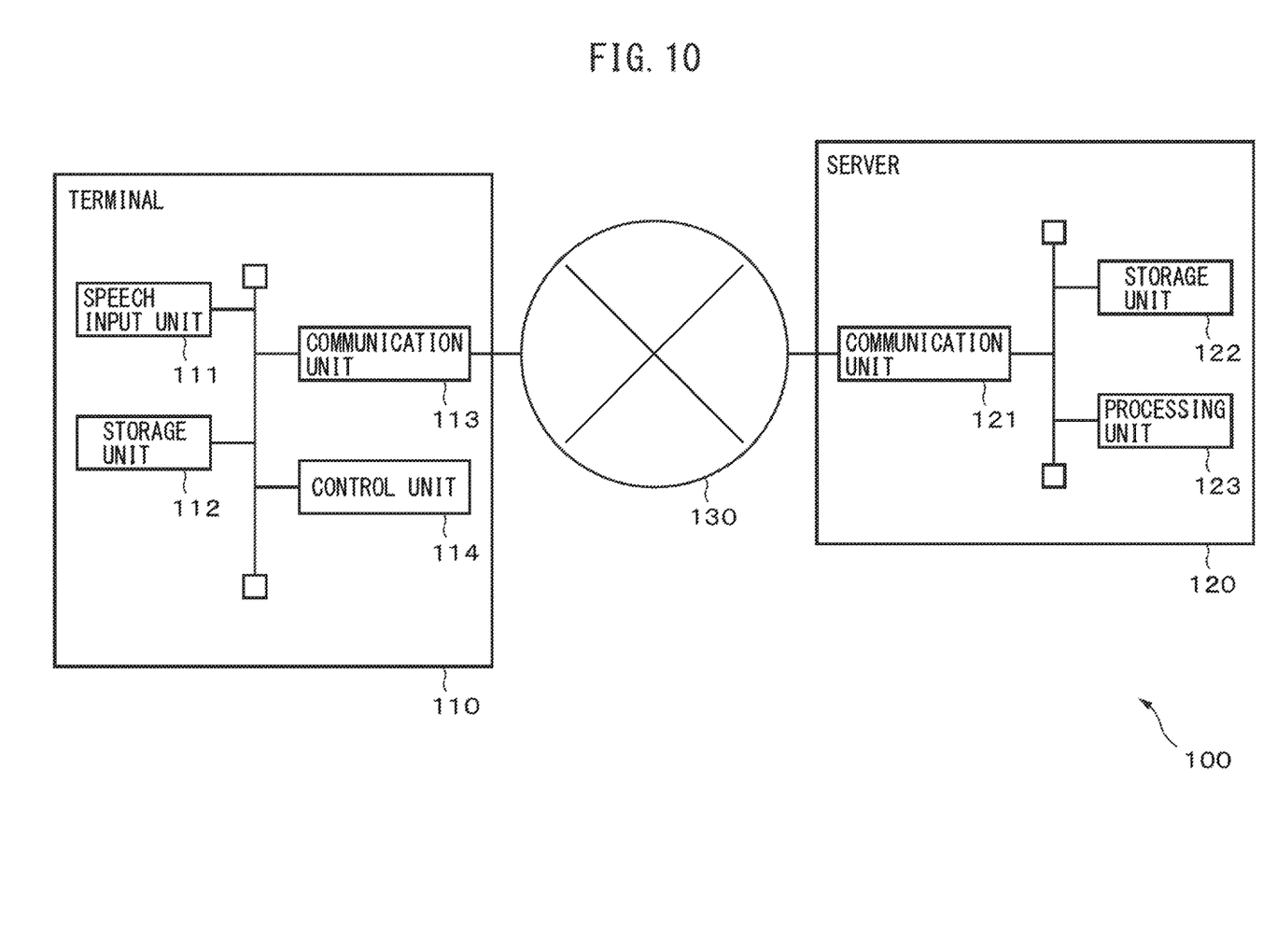
FIG. 10 is a block diagram illustrating the schematic configuration of a server-client system equipped with the keyword detector according to the embodiment or its modification.

FIG. 10 is a block diagram illustrating the schematic configuration of a server-client system equipped with the keyword detector according to any of the above-described embodiments or its modification. A server-client system 100 includes a terminal 110 and a server 120, which can communicate with each other via a communication network 130. The server-client system 100 may include a plurality of terminals 110. Similarly, the server-client system 100 may include a plurality of servers 120.

The terminal 110 includes a speech input unit 111, a storage unit 112, a communication unit 113, and a control unit 114. The speech input unit 111, the storage unit 112, and the communication unit 113 are connected to, e.g., the control unit 114 via buses.

The speech input unit 111 includes, e.g., an audio interface and an A/D converter. The speech input unit 111, for example, acquires an analog speech signal containing a conversation from a telephone line and samples the speech signal at a predetermined sampling rate to digitize the speech signal. The speech input unit 111 outputs the digital speech signal to the control unit 114.

The storage unit 112 includes, e.g., nonvolatile and volatile semiconductor memories. The storage unit 112 stores, e.g., a computer program for controlling the terminal 110, information for identifying the terminal 110, and various data and computer programs used for keyword detection process.

The communication unit 113 includes an interface circuit for connecting the terminal 110 to the communication network 130. The communication unit 113 sends feature vectors received from the control unit 114 to the server 120 via the communication network 130, together with information for identifying the terminal 110.

The control unit 114 includes one or more processors and its peripheral circuit. The control unit 114 implements the function of the feature extraction unit 21 among the functions of the processing unit according to each of the above-described embodiments or its modification. In other words, the control unit 114 divides a speech signal into frames and calculates a feature vector including a plurality of features representing characteristics of a human voice, from each frame. The control unit 114 sends the feature vector for each frame to the server 120 via the communication unit 113 and the communication network 130, together with information for identifying the terminal 110.

The server 120 includes a communication unit 121, a storage unit 122, and a processing unit 123. The communication unit 121 and the storage unit 122 are connected to the processing unit 123 via buses.

The communication unit 121 includes an interface circuit for connecting the server 120 to the communication network 130. The communication unit 121 receives the feature vector for each frame and the information for identifying the terminal 110 from the terminal 110 via the communication network 130 and transfers them to the processing unit 123.

The storage unit 122 includes, e.g., nonvolatile and volatile semiconductor memories. The storage unit 122 stores, e.g., a computer program for controlling the server 120. The storage unit 122 may further store a computer program for executing keyword detection process and a feature vector for each frame received from each terminal.

The processing unit 123 includes one or more processors and its peripheral circuit. The processing unit 123 implements the function of each unit other than the feature extraction unit 21 among the functions of the processing unit of the keyword detector according to each of the above-described embodiments or its modification. In other words, the processing unit 123 detects a keyword using the feature vector for each frame received from the terminal 110. The processing unit 123 may determine whether, for example, a conversation regarding a specific content, such as a phone phishing scam, is being made on the basis of the number of times each individual keyword is detected. When, for example, the number of times each individual keyword is detected is equal to or larger than a threshold set for the keyword, the processing unit 123 may determine that a conversation about such a specific content is being made. Upon determining that a conversation about such a specific content is being made, the processing unit 123 may, for example, report the fact that an unnatural conversation is being made to a security system (not illustrated) via the communication unit 121, as well as sending information for identifying the terminal 110. The operator of the security system can thus support the user of the terminal 110.

According to this embodiment, each individual terminal 110 may preferably extract a set of features for each frame from a speech signal recording a conversation and send it to the server 120. The terminal 110 may send the speech signal itself to the server 120. In this case, the processing unit 123 of the server 120 implements each function of the processing unit of the keyword detector according to each of the above-described embodiments or its modification.

A computer program for causing a computer to implement each function of the processing unit of the keyword detector according to each of the above-described embodiments or its modification may be provided in a form recorded on a non-transitory computer-readable medium such as a magnetic or optical recording medium.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A keyword detector comprising:
a processor configured to:
divide a speech signal into frames each with a predetermined time length;
calculate a feature vector including a plurality of features representing characteristics of a human voice, for each frame;
input the feature vector for each of the frames to a deep neural network to calculate a first output probability for each of a plurality of triphones according to a sequence of phonemes contained in a predetermined keyword, for each of at least one state of a Hidden Markov Model and calculate a second output probability for each of a plurality of monophones, for each of at least one state of the Hidden Markov Model;
calculate a first likelihood representing a probability that the predetermined keyword is uttered in the speech signal by applying the first output probability to the Hidden Markov Model;
calculate a second likelihood for a most probable phoneme string in the speech signal by applying the second output probability to the Hidden Markov Model;
determine whether the keyword is detected on the basis of the first likelihood and the second likelihood; wherein
the deep neural network is common to the plurality of triphones and the plurality of monophones, and comprises an input layer to which the feature vectors are input, a plurality of hidden layers common to the plurality of triphones and the plurality of monophones, and an output layer including a plurality of first output neurons corresponding to the plurality of triphones, respectively, and a plurality of second output neurons corresponding to the plurality of monophones, respectively, for each of the at least one state of the Hidden Markov Model, and
when the feature vectors are input to the input layer of the deep neural network, calculation of the first output probability includes calculating the first output probability on the basis of values respectively output from the plurality of first output neurons, and calculation of the second output probability includes calculating the second output probability on the basis of values respectively output from the plurality of second output neurons, and
learn the deep neural network by designating the values output from the output neurons such that when the feature vector calculated from a speech signal of a sample corresponding to a predetermined triphone among the plurality of triphones is input to the deep neural network, the value output from an output neuron corresponding to the predetermined triphone among the plurality of first output neurons, and the value output from an output neuron corresponding to a monophone identical to a central phoneme of the predetermined triphone among the plurality of second output neurons are larger than the values output from the other output neurons.

2. A keyword detection method comprising:
dividing a speech signal into frames each with a predetermined time length;
calculating a feature vector including a plurality of features representing characteristics of a human voice, for each frame;
inputting the feature vector for each of the frames to a deep neural network to calculate a first output probability for each of a plurality of triphones according to a sequence of phonemes contained in a predetermined keyword and a second output probability for each of a plurality of monophones, for each of at least one state of a Hidden Markov Model;
calculating a first likelihood representing a probability that the predetermined keyword is uttered in the speech signal by applying the first output probability to the Hidden Markov Model;
calculating a second likelihood for a most probable phoneme string in the speech signal by applying the second output probability to the Hidden Markov Model;
determining whether the keyword is detected on the basis of the first likelihood and the second likelihood; wherein
the deep neural network is common to the plurality of triphones and the plurality of monophones, and comprises an input layer to which the feature vectors are input, a plurality of hidden layers common to the plurality of triphones and the plurality of monophones, and an output layer including a plurality of first output neurons corresponding to the plurality of triphones, respectively, and a plurality of second output neurons corresponding to the plurality of monophones, respectively, for each of the at least one state of the Hidden Markov Model, and when the feature vectors are input to the input layer of the deep neural network, calculation of the first output probability includes calculating the first output probability on the basis of values respectively output from the plurality of first output neurons, and calculation of the second output probability includes calculating the second output probability on the basis of values respectively output from the plurality of second output neurons, and learning the deep neural network by designating the values output from the output neurons such that when the feature vector calculated from a speech signal of a sample corresponding to a predetermined triphone among the plurality of triphones is input to the deep neural network, the value output from an output neuron corresponding to the predetermined triphone among the plurality of first output neurons, and the value output from an output neuron corresponding to a monophone identical to a central phoneme of the predetermined triphone among the plurality of second output neurons are larger than the values output from the other output neurons.

3. A non-transitory computer-readable recording medium having recorded thereon a computer program for keyword detection that causes a computer to execute a process comprising:

dividing a speech signal into frames each with a predetermined time length;

calculating a feature vector including a plurality of features representing characteristics of a human voice, for each frame;

inputting the feature vector for each of the frames to a deep neural network to calculate a first output probability for each of a plurality of triphones according to a sequence of phonemes contained in a predetermined keyword and a second output probability for each of a plurality of monophones, for each of at least one state of a Hidden Markov Model;

calculating a first likelihood representing a probability that the predetermined keyword is uttered in the speech signal by applying the first output probability to the Hidden Markov Model;

calculating a second likelihood for a most probable phoneme string in the speech signal by applying the second output probability to the Hidden Markov Model;

determining whether the keyword is detected on the basis of the first likelihood and the second likelihood; wherein the deep neural network is common to the plurality of triphones and the plurality of monophones, and comprises an input layer to which the feature vectors are input, a plurality of hidden layers common to the plurality of triphones and the plurality of monophones, and an output layer including a plurality of first output neurons corresponding to the plurality of triphones, respectively, and a plurality of second output neurons corresponding to the plurality of monophones, respectively, for each of the at least one state of the Hidden Markov Model, and when the feature vectors are input to the input layer of the deep neural network, calculation of the first output probability includes calculating the first output probability on the basis of values respectively output from the plurality of first output neurons, and calculation of the second output probability includes calculating the second output probability on the basis of values respectively output from the plurality of second output neurons, and learning the deep neural network by designating the values output from the output neurons such that when the feature vector calculated from a speech signal of a sample corresponding to a predetermined triphone among the plurality of triphones is input to the deep neural network, the value output from an output neuron corresponding to the predetermined triphone among the plurality of first output neurons, and the value output from an output neuron corresponding to a monophone identical to a central phoneme of the predetermined triphone among the plurality of second output neurons are larger than the values output from the other output neurons.

* * * * *